(12) United States Patent
Sethuraman et al.

(10) Patent No.: US 10,802,809 B2
(45) Date of Patent: Oct. 13, 2020

(54) PREDICTING PHYSICAL MEMORY ATTRIBUTES BY COMPILER ANALYSIS OF CODE BLOCKS

(71) Applicant: International Business Machines Corporation, Armonk, NY (US)

(72) Inventors: Saravanan Sethuraman, Karnataka (IN); Anshuman Khandual, Karnataka (IN); Archana Ravindar, Karnataka (IN); Venkata K Tavva, Telangana (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/292,737

(22) Filed: Mar. 5, 2019

(65) Prior Publication Data

US 2020/0285453 A1 Sep. 10, 2020

(51) Int. Cl.
*G06F 8/41* (2018.01)

(52) U.S. Cl.
CPC ............ *G06F 8/4434* (2013.01); *G06F 8/425* (2013.01); *G06F 8/436* (2013.01)

(58) Field of Classification Search
None
See application file for complete search history.

(56) References Cited

U.S. PATENT DOCUMENTS

| 7,549,034 B2* | 6/2009 | Foster, Sr. ............ G06F 1/3225 |
| | | 711/105 |
| 8,813,018 B1* | 8/2014 | Gamsa .................... G06F 30/30 |
| | | 716/132 |
| 9,250,878 B1* | 2/2016 | McCallum ............ G06F 8/4434 |
| 2017/0076422 A1* | 3/2017 | Shen ....................... G06F 1/324 |
| 2018/0321925 A1* | 11/2018 | Kee .......................... G06F 8/433 |

FOREIGN PATENT DOCUMENTS

WO 2018050528 A1 3/2018

OTHER PUBLICATIONS

Udayakumaran, Dynamic Allocation for Scratch-Pad Memory Using Compile-Time Decisions:, 2006, ACM Transactions (Year: 2006).*

* cited by examiner

*Primary Examiner* — Hossain M Morshed
(74) *Attorney, Agent, or Firm* — Garg Law Firm, PLLC; Rakesh Garg; David Quinn

(57) ABSTRACT

Predicting physical memory attributes by compiler analysis of code blocks includes receiving source code including at least one code block, and identifying a buffer associated with the at least one code block. Buffer access characteristics associated with the buffer are determined from the at least one code block. The buffer access characteristics are mapped to physical memory attributes associated with one or more physical memories of a computing system. Executable program code including a system call associated with memory allocation is generated based upon the physical memory attribute values.

20 Claims, 17 Drawing Sheets

*FIGURE 12*

| ACCESS | SERIAL | 2-BIT REP. 00 |
|---|---|---|
| | MEDIUM | 10 |
| | RANDOM | 11 |
| FREQUENCY | LOW | 0 |
| | HIGH | 1 |
| SIZE | LOW | 00 |
| | MEDIUM | 01 |
| | HIGH | 11 |

|  | HBM | LL DRAM | DDR4 DRAM | DDR5 DRAM | NV DIMM | STT MRAM | PCM | 3D XP | HMC | LP DDR |
|---|---|---|---|---|---|---|---|---|---|---|
| LATENCY | '10 | '11 | '01 | '01 | '01 | '00 | '00 | '00 | '01 | '01 |
| BW | '11 | '01 | '01 | '01 | '01 | '01 | '01 | '10 | '10 | '01 |
| RELIABILITY | '10 | '10 | '11 | '11 | '10 | '00 | '00 | '01 | '10 | '11 |
| POWER | '01 | '10 | '10 | '10 | '10 | '00 | '00 | '00 | '01 | '11 |
| DEVICE COMPUTE | X | X | X | X | X | X | X | X | X | X |
| DENSITY | '11 | '01 | '11 | '11 | '11 | '10 | '10 | '11 | '10 | '01 |
| PERSISTENCE | '00 | '00 | '00 | '00 | '11 | '10 | '10 | '10 | '10 | '00 |

| .ACCESS | .FREQUENCY | .SIZE | .LAT | .BW | .RELIABILITY | .POWER | .DEVICE COMPUTE | .DENSITY | .PERSISTENCE |
|---|---|---|---|---|---|---|---|---|---|
| '00 | '0 | '00 | '11 | '00 | '1x | .xx | .xx | '00 | '1x |
| '01 | '0 | '00 | '11 | '0x | '1x | .xx | .xx | '00 | '1x |
| '11 | '0 | '00 | '11 | '1x | '1x | .xx | .xx | '00 | '1x |
| '00 | '1 | '00 | '11 | '1x | '1x | .xx | .xx | '00 | '1x |
| '01 | '1 | '00 | '11 | '1x | '1x | .xx | .xx | '00 | '1x |
| '11 | '1 | '00 | '11 | '1x | '1x | .xx | .xx | '00 | '1x |
| '00 | '0 | '01 | '1x | '00 | '1x | .xx | .xx | '01/10 | '0x |
| '01 | '0 | '01 | '1x | '0x | '1x | .xx | .xx | '01/10 | '0x |
| '11 | '0 | '01 | '1x | '1x | '1x | .xx | .xx | '01/10 | '0x |
| '00 | '1 | '01 | '1x | '1x | '1x | .xx | .xx | '01/10 | '0x |
| '01 | '1 | '01 | '1x | '1x | '1x | .xx | .xx | '01/10 | '0x |
| '11 | '1 | '01 | '1x | '1x | '1x | .xx | .xx | '01/10 | '0x |
| '00 | '0 | '11 | '00/'01/'10 | '00 | '0x | .xx | .xx | '1x | '0x |
| '01 | '0 | '11 | '00/'01/'10 | '0x | '0x | .xx | .xx | '1x | '0x |
| '00 | '1 | '11 | '00/'01/'10 | '1x | '0x | .xx | .xx | '1x | '0x |
| '01 | '1 | '11 | '00/'01/'10 | '1x | '0x | .xx | .xx | '1x | '0x |
| '11 | '1 | '11 | '00/'01/'10 | '1x | '0x | .xx | .xx | '1x | '0x |

1400

PREDICTING PHYSICAL MEMORY ATTRIBUTES BY COMPILER ANALYSIS OF CODE BLOCKS

TECHNICAL FIELD

The present invention relates generally to a method, system, and computer program product for compiler analysis of code blocks. More particularly, the present invention relates to a method, system, and computer program product for predicting physical memory attributes by compiler analysis of code blocks.

BACKGROUND

A compiler is a computer program that typically transforms or translates source computer code written in a source computer programming language to another programming language and/or a target program or application executable by a computing system. Typically, a compiler performs receives source code and performs preprocessing, lexical analysis, syntax analysis, semantic analysis, code optimization, and code generation to produce executable code in the form of a program or application. The program or application is compiled to execute on a target platform having one or more processors and one or more memory types or technologies capable of storing the program or application during execution.

SUMMARY

The illustrative embodiments provide a method, system, and computer program product. An embodiment of a computer-implemented method includes receiving source code including at least one code block, and identifying a buffer associated with the at least one code block. The embodiment further includes determining buffer access characteristics associated with the buffer from the at least one code block. The embodiment further includes mapping the buffer access characteristics to physical memory attributes associated with one or more physical memories of a computing system. The embodiment further includes generating executable program code including a system call associated with memory allocation based upon the physical memory attribute values.

In another embodiment, the buffer access characteristics include one or more of an interleave value of the buffer, a frequency of access of the buffer, or a size of the buffer. In another embodiment, identifying the buffer includes inserting semantic actions in the at least one source block to detect the buffer.

In another embodiment, determining the buffer access characteristics further includes determining loop iterations and loop limits of an iterative loop within the at least one code block. In another embodiment, determining the buffer access characteristics further includes inserting instrumentation within the at least one code block to capture loop iterations and loop limits of an iterative loop within the at least one code block during execution of the at least one code block.

Another embodiment further includes generating an output file including buffer information from the instrumentation, and processing the output file to compute the buffer access characteristics.

Another embodiment further includes selecting a memory type of the one or more physical memories based upon the mapping of the buffer access characteristics to physical memory attribute values.

In another embodiment, the determining of the buffer access characteristics associated with the buffer includes semantic analysis of the at least one code block.

In another embodiment, identifying the buffer associated with the at least one code block further includes identifying a memory pointer in the at least one code block.

In another embodiment, the physical memory attributes include one or more of a latency, a bandwidth, a power consumption, a device compute ability, a persistence, or a size of a memory device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 12 depicts an example buffer access character table in accordance with an illustrative embodiment;

FIG. 13 depicts an example physical memory attribute table in accordance with an illustrative embodiment;

FIG. 14 depicts an example buffer access character to physical memory attributes mapping table in accordance with an illustrative embodiment.

DETAILED DESCRIPTION

Figure 1:
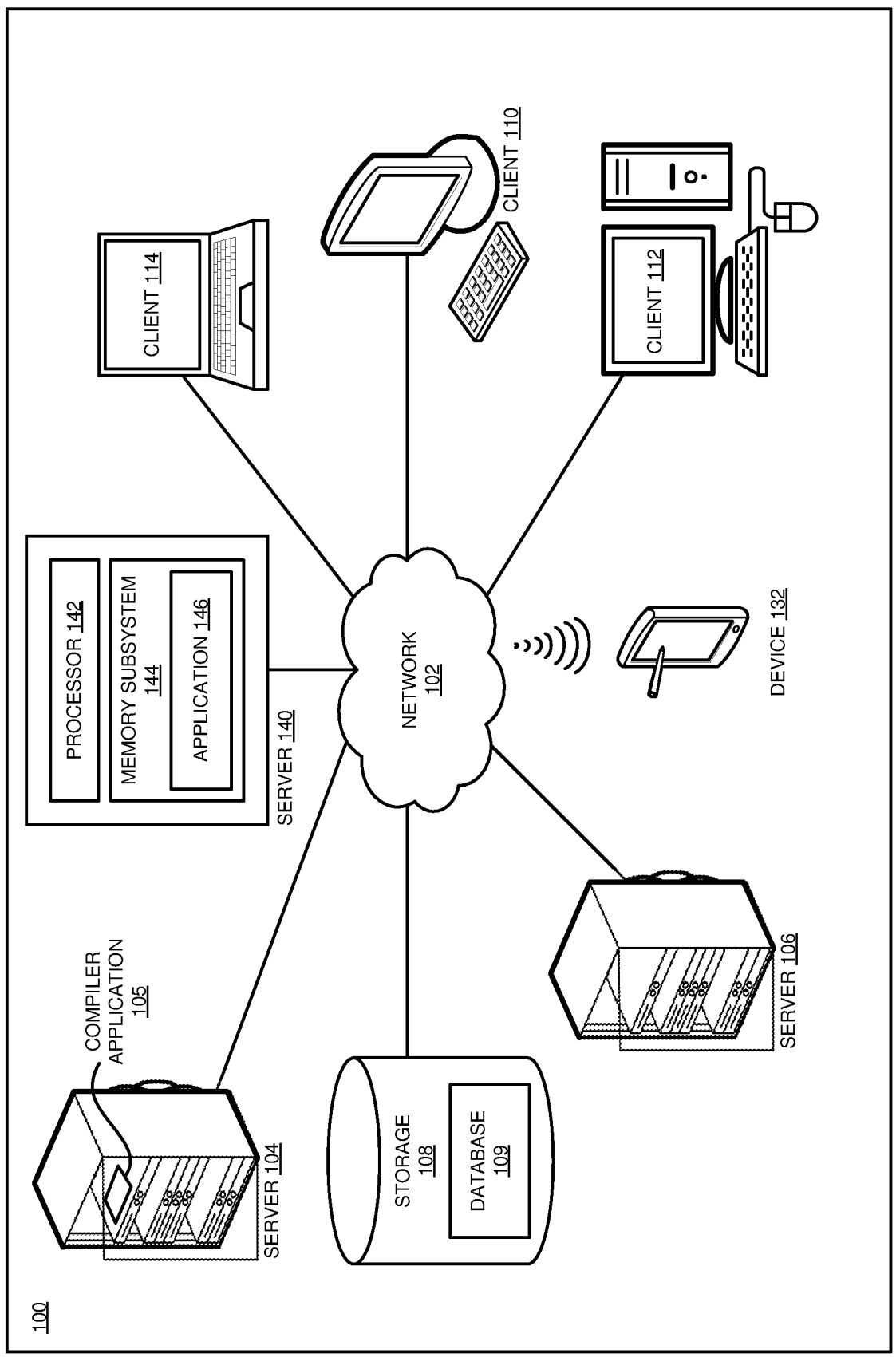
FIG. 1 depicts a block diagram of a network of data processing systems in which illustrative embodiments may be implemented.

The illustrative embodiments described herein are directed to predicting physical memory attributes by compiler analysis of code blocks. Embodiments recognize that a computing system having a memory subsystem with heterogeneous standards and technologies is currently realizable and existent. For example, dynamic random-access memory (DRAM), spin-transfer torque-magnetoresistive random-access memory (STT-MRAM), phase-change memory (PCM) and other memory technologies may be included in the same memory subsystem. Further, DRAM alone may include different standards such as double data rate fifth-generation (DDR5), double data rate fourth-generation (DDR4), and low power DDR (LPDDR) DRAM may be included in the same system.

Embodiments recognize that enterprise servers and other computing systems may include co-existing applications with various resource needs and systems demands. Embodiments further recognize that in such computing systems, it would be highly beneficial to allocate, amp, and migrate applications on-demand to a memory subsystem of the computing system that aptly suits the needs of the particular application. Memory allocation requests and to memory devices have associated properties such as latency (e.g., speed of random access), bandwidth (e.g., speed of contiguous data stream processing), reliability (e.g., probable rate of memory failure), power consumption (e.g., power consumption in holding data in memory), device compute (e.g., non-CPU compute capabilities of the device), density (e.g., compactness of allocated memory), and persistence (e.g., volatile (DRAM) or non-volatile (STT-MRAM, PCM) memory technology).

Various embodiments described herein provide for solving compiler specific problems and platform specific issues with respect to memory maps by compiler analysis of source code blocks to determine physical memory most suitable for allocation with the code blocks. An embodiment includes mapping application code blocks by a compiler into intermediate triplet values identifying characteristics of the memory requirements of the code block such as access pattern, frequency, and size. The embodiment further includes converting the triplets into memory attribute values to be provided as input arguments to memory allocation based system calls (e.g., mbind/madvise) to allocate particular memory from among different memory types for the application blocks best suited for the code block based upon the memory attribute values. Accordingly, physical memory placement choices for an application virtual memory buffer are improved.

In an embodiment, a compiler deduces a single code identification set from a given instance of an iterative code block, such as a "for { }", "do { } while", or "while { }" code block, of any nested level looking at a possible range (e.g., start/end) for a buffer address, effective loop index increment at each nested level, and overall possible calling frequency of the whole iterative code block. In an embodiment, the compiler creates and stores multiple code identification sets for all instances of iterative access for a given virtual memory buffer in a runtime managed data structure. In the embodiment, the compiler analyzes the data structure to determine a final and effective code identification set for the virtual memory buffer. In particular embodiments, the multi value code identification set for a given virtual memory buffer is analyzed based upon a relative weight for each instance of iteration in proportion to the size and frequency of access.

In an embodiment, the compiler maps an effective code identification set for a given virtual memory buffer into effective memory attribute values. In the embodiment, the memory attribute values are provided as an argument into a memory allocation system calls (e.g., mbind/madvise) which in turn involve examining kernel exported memory attribute values such as bandwidth, latency, or power consumption.

In an embodiment, a compiler receives source program code and inserts semantic actions in the source code to recognize buffers of interest and copies to the buffers in one or more blocks of the source code. In one or more embodiments, a semantic action includes code inserted during semantic parsing of the source code to perform an action such as additional processing of parsed code to generate intermediate code. In the embodiment, the compiler sets the buffer of interest characteristics in the semantic action as attributes of program variables and statements. In the embodiment, the compiler further inserts semantic actions to compute loop iterations and limits within the source code that can be detected statically, and sets these loop characteristics as program variables and statements.

In the embodiment, the compiler traverses a program control flow graph and computes using semantic attributes the loop iteration and limits that can be detected statically and set these as attributes of program statements. In the embodiment, for cases in which the iterations and limits cannot be determined statically, the compiler traverses the program control flow graph and inserts instrumentation to capture the iteration and limits information dynamically. In one or more embodiments, instrumentation refers to one or more commands to collect and output measurement data during runtime of the program code.

In the embodiment, the program code is run with representative smaller inputs, and the instrumentation produces an output file containing the addresses of buffers of interest within the source code. In the embodiment, the compiler processes the instrumentation output and computes memory attributes such as size, interleave, and frequency information for each of the buffers of interest. In the embodiment, the compiler selects a physical memory from different types of technologies of physical memory present in a computing system for a buffer of interest and allocates the physical memory within output application code for the buffer of interest based upon the memory attributes of the buffer of interest.

An embodiment can be implemented as a software application. The application implementing an embodiment can be configured as a modification of an existing compiler, as a separate application that operates in conjunction with an existing compiler, a standalone application, or some combination thereof.

The illustrative embodiments are described with respect to certain types of tools and platforms, procedures and algorithms, services, devices, data processing systems, environments, components, programming languages, compilers, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
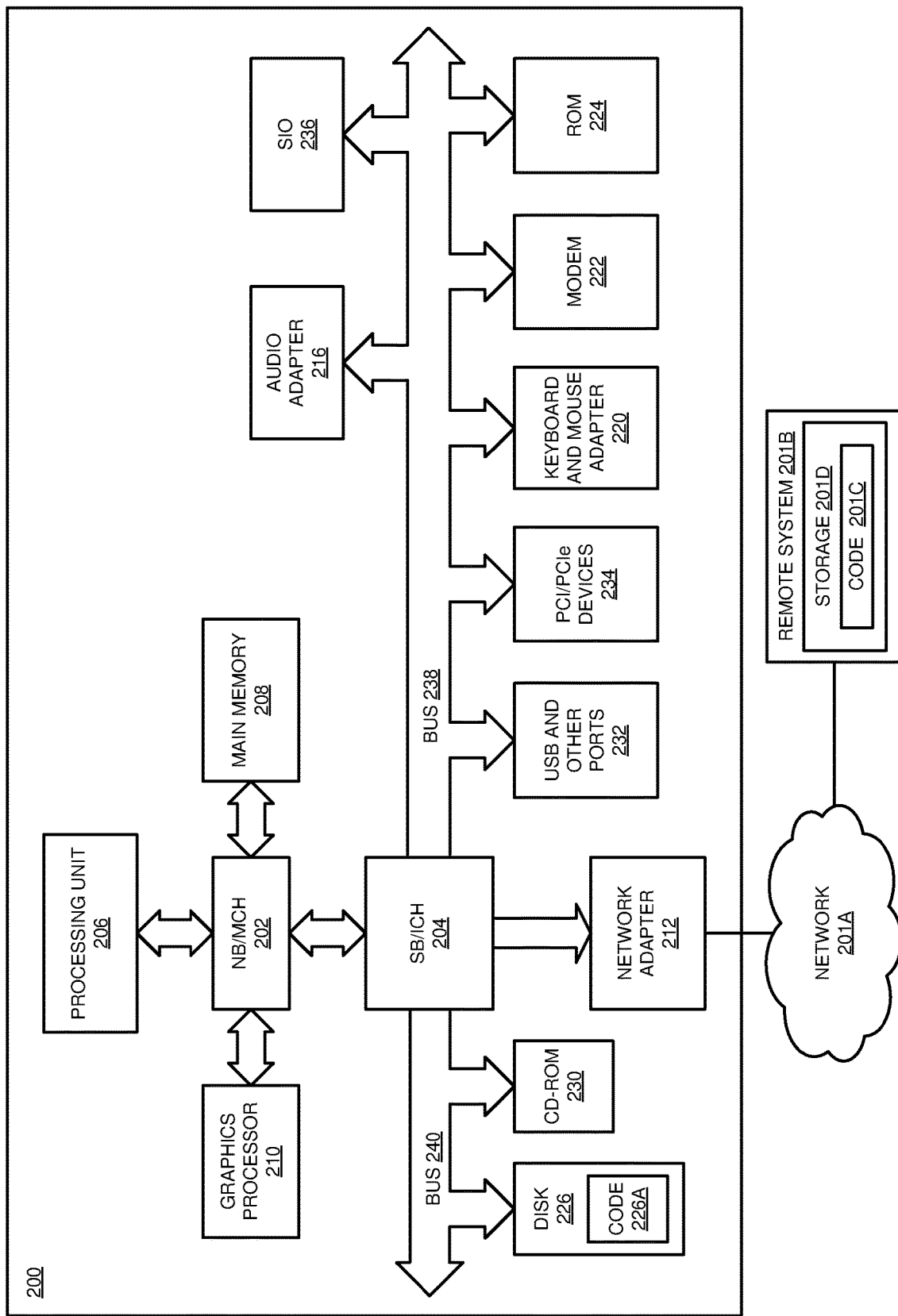
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104, server 106, and server 140 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104, 106, 140 and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, 114, and 140 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104, 106, and 140, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes a compiler application 105 that may be configured to implement one or more of the functions described herein for predicting physical memory attributes by compiler analysis of code blocks and producing executable code in accordance with one or more embodiments.

Server 140 includes a processor 142 and a memory subsystem 144. Processor 142 is configured for executing an application 146 stored within memory subsystem 144 as described herein with respect to various embodiments. In one or more embodiments, application 146 is produced by compiler application 105 and received from server 104. In one or more embodiments, memory subsystem 144 includes one or more memory devices and may include different memory devices having different types or technologies. In one or more embodiments, server 106 implements a serverless cloud computing environment. Storage device 108 includes one or more databases 109 that may be configured to store source code or other data associated with compiler application 105 such as one or more tables as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
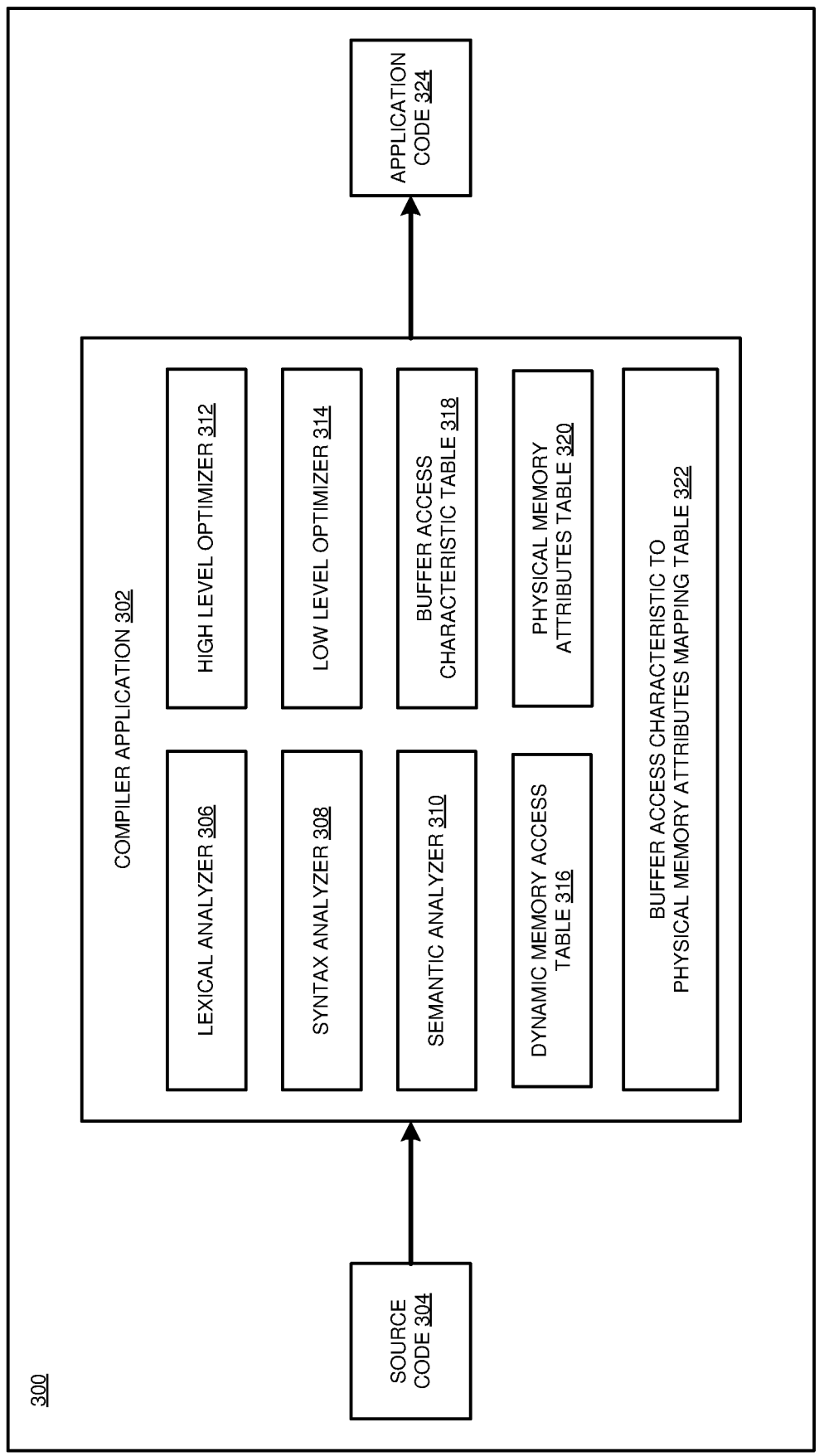
FIG. 3 depicts a block diagram of an example configuration for predicting physical memory attributes by compiler analysis of code blocks in accordance with an illustrative embodiment.

With reference to FIG. 3, this figure depicts a block diagram of an example configuration 300 for predicting physical memory attributes by compiler analysis of code blocks in accordance with an illustrative embodiment. The example embodiment includes a compiler application 302. In a particular embodiment, compiler application 302 is an example of compiler application 105 of FIG. 1.

Compiler application 302 is configured to receive source code 304. Compiler application 302 includes a lexical analyzer 306, a syntax analyzer 308, a semantic analyzer 310, a high level optimizer 312, and a low level optimizer 314. Compiler application 302 further includes a dynamic memory access table 316, a buffer access characteristic table 318, a physical memory attributes table 320, and a buffer access characteristic to physical memory attributes mapping table 322.

Lexical analyzer 306 is configured to perform lexical analysis on source code 304 using lexical grammar rules to tokenize portions of source code 304 to produce a sequence of tokens including, for example, symbols, keywords, identifiers, etc. Syntax analyzer 308 is configured to parse and perform syntax analysis on source code 304 to verify according to a syntax grammar that a valid sequence of tokens are produced from the lexical analysis.

Semantic analyzer 310 is configured to perform semantic analysis to gather semantic information from the parsed code and insert semantic actions for recognizing buffers of interest and determining associated attributes as discussed with respect to one or more embodiments. Semantic analyzer 310 is further configured to capture attributes such as size, existence in loops, loop iteration counts, and system call type used to allocate memory.

High level optimizer is configured to consider the static attributes of buffers of interest calculated by semantic analyzer 310 and computes the corresponding memory attributes that can be mapped to the most suitable physical memory available in the system using dynamic memory access table 316. High level optimizer 312 is further configured to perform high level optimization on the semantically analyzed code to generate optimized intermediate code. Low level optimizer 312 is configured to perform low level optimization on the optimized intermediate code to generate application code 324.

Dynamic memory access table 316 is configured to store a table including identifiers of the buffers of interest in association with determined memory attributes including size, interleave, and frequency information for each of the buffers of interest as further described herein. Buffer access characteristic table 318 is configured to store a table including a classification levels of memory attributes as further described herein. Physical memory attributes table 320 is configured to store a table representing rankings of a number of physical memory attributes as further described herein. Buffer access characteristic to physical memory attributes mapping table 322 is configured to store a table including a mapping of buffer access character tuples to physical memory tuples as further described herein.

Figure 4:
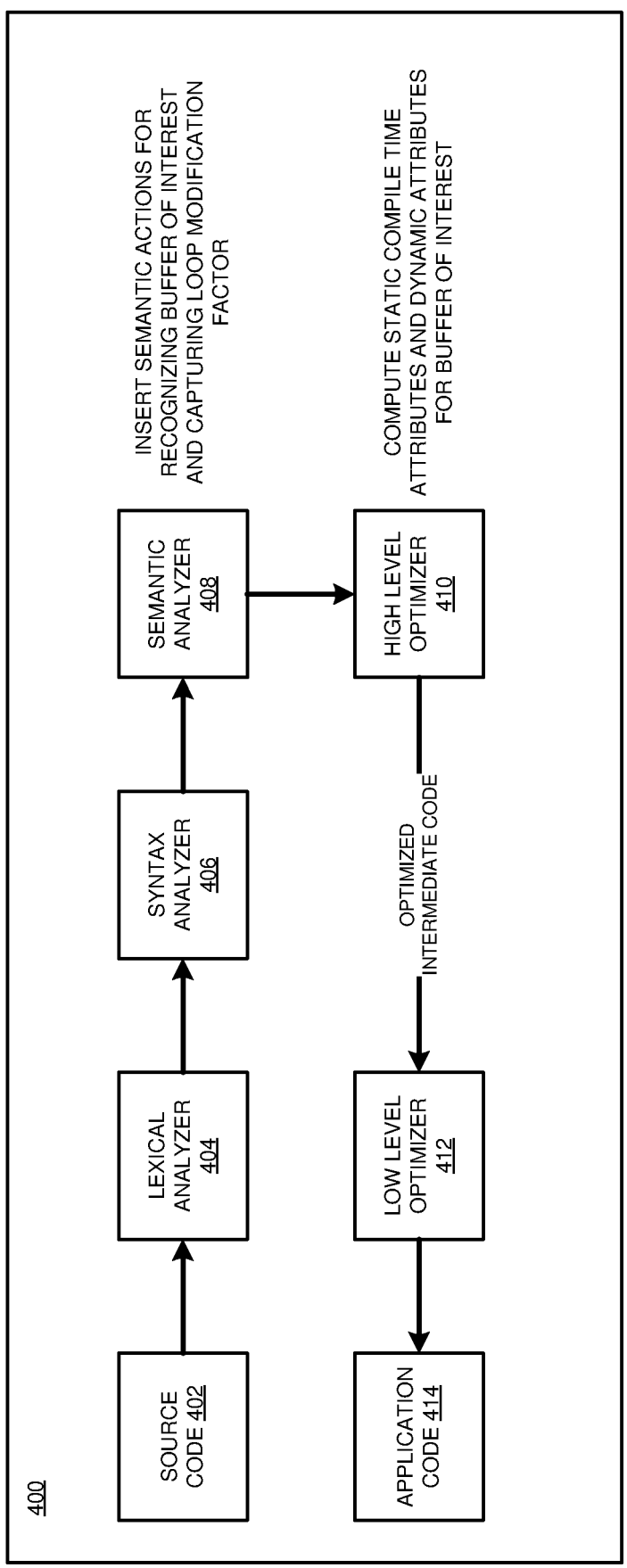
FIG. 4 depicts an example sequence for predicting physical memory attributes by compiler analysis of code blocks in accordance with an illustrative embodiment.

With reference to FIG. 4, this figure depicts an example sequence 400 for predicting physical memory attributes by compiler analysis of code blocks in accordance with an illustrative embodiment. In one or more embodiments, example sequence 400 is performed by a compiler application such as compiler application 105 of FIG. 1 or compiler application 302 of FIG. 3. In the embodiment, the compiler application receives source code 402 and lexical analyzer 404 performs lexical analysis on source code 402 using lexical grammar rules to tokenize portions of source code 304 to produce a sequence of tokens. Syntax analyzer 406 parses and perform syntax analysis on source code 402 to verify according to a syntax grammar that a valid sequence of tokens are produced from the lexical analysis and generate a syntax tree.

Semantic analyzer 408 performs semantic analysis to gather semantic information from the parsed code and inserts semantic actions for recognizing buffers of interest and capturing a loop modification factors. Semantic analyzer 408 generates semantic actions for recognizing buffers of interest including detecting copies of pointers into temporary points. Semantic analyzer 408 further computes compile time attributes for the buffers of interest. Semantic analyzer 408 further inserts semantic actions for capturing loop modification factors of one or more loops within source code 304 indicative of a modification of an iterative loop within source code 402.

Semantic analyzer 408 further computes static compile time attributes for each of the buffers of interest such as size, existence in loop, loop iteration counts, system call type used to allocate memory, and loop iteration counts. High level optimizer 410 traverses a control flow graph to access the attributes and computes buffer characteristics such as a median buffer size value, an access median interleave value, and an access median frequency value. The median buffer size value indicates a required memory size of the buffer of interest. The access median interleave value indicates a median interleave of an iterative loop of the buffer of interest, and the access median frequency value indicates a median frequency of access of the buffer of interest. For cases in which static compile time attributes cannot be computed, the compiler inserts instrumentation to compute the attributes including median buffer size, median interleave, and median frequency dynamically. In such cases, source code 402 is instrumented in locations in which buffers of interest are accessed to compute the size of the buffers, interleave, and frequency. In particular embodiments, the instrumentation records accesses of addresses within the buffer of interest. High level optimizer 410 further allocates physical memory for the buffers of interest according to the memory attributes computed either by static or dynamic analysis.

After performing the operations of computing the memory attributes, mapping the memory attributes to physical memory attributes, and generating instructions to allocate physical memory for buffers of interest according to computed memory attributes, high level optimizer 410 performs high level optimization on the semantically analyzed code to generate optimized intermediate code. Low level optimizer 412 performs low level optimization on the optimized intermediate code to generate application code 414.

Figure 5A:
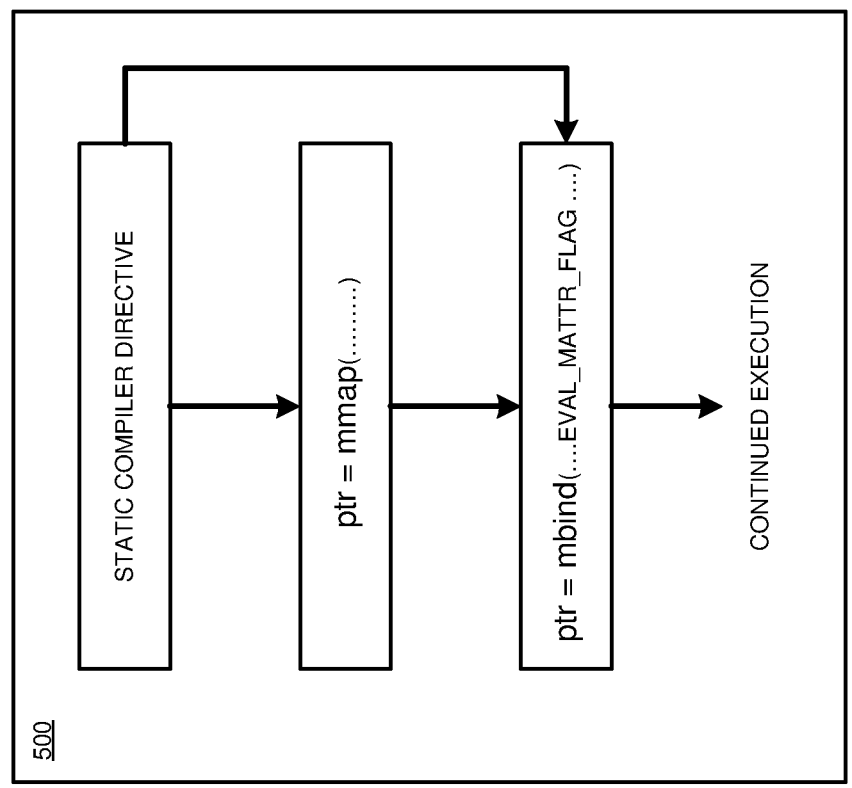
FIG. 5A depicts an example sequence for allocating memory using a static compiler directive in accordance with an illustrative embodiment.

With reference to FIG. 5A, this figure depicts an example sequence 500 for allocating memory using a static compiler directive in accordance with an illustrative embodiment. In example sequence 500, a static compiler directive is inserted by the compiler to determine attributes of a buffer of interest indicated by a setting of a pointer ptr using an mmap command and allocating a memory range for the buffer of interest and evaluating memory attributes using, for example, an mbind command. Execution contains thereafter.

Figure 5B:
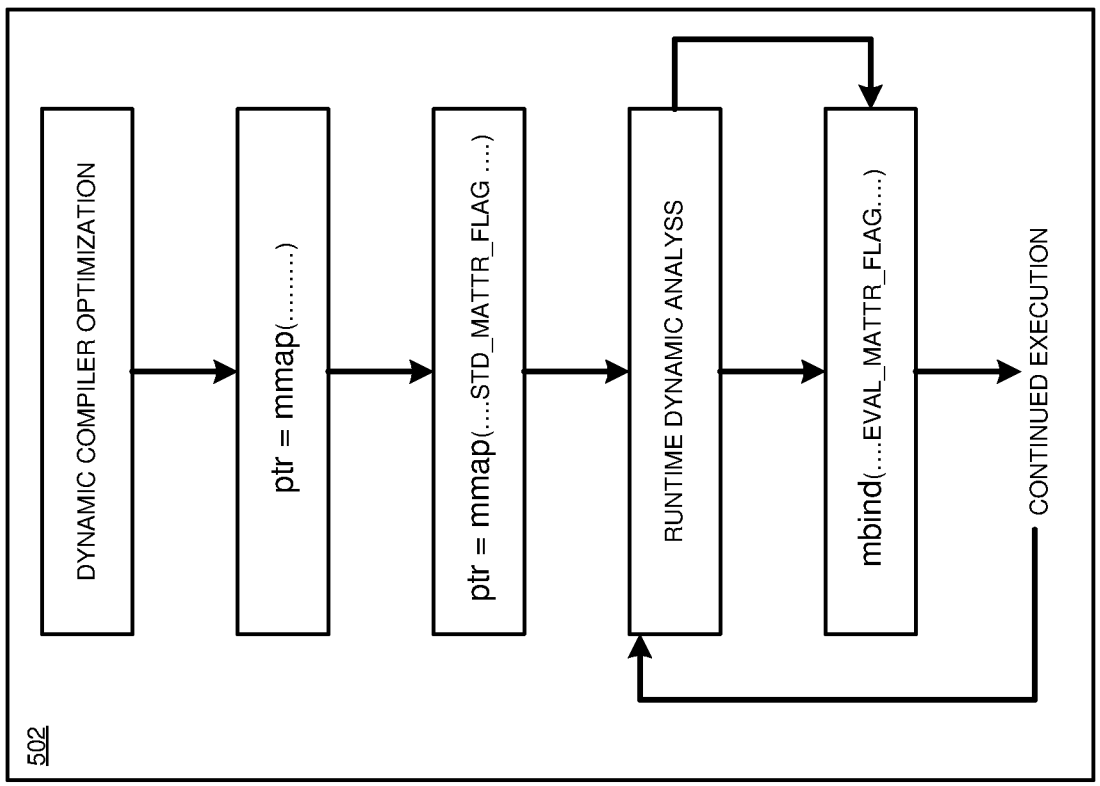
FIG. 5B depicts an example sequence for allocating memory using dynamic compiler optimization in accordance with an illustrative embodiment.

With reference to FIG. 5B, this figure depicts an example sequence 502 for allocating memory using dynamic compiler optimization in accordance with an illustrative embodiment. In example sequence 502, the compiler determines attributes of a buffer of interest indicated by a setting of a pointer ptr using an mmap command and allocating a memory range for the buffer of interest using, for example, an mbind command. The compiler than performs dynamic runtime analysis to dynamically determine attributes of buffers of interest that cannot be determined statically and allocates memory and evaluates memory attributes for the buffers of interest. The runtime dynamic analysis may continue until all buffers of interest have been analyzed.

Figure 6A:
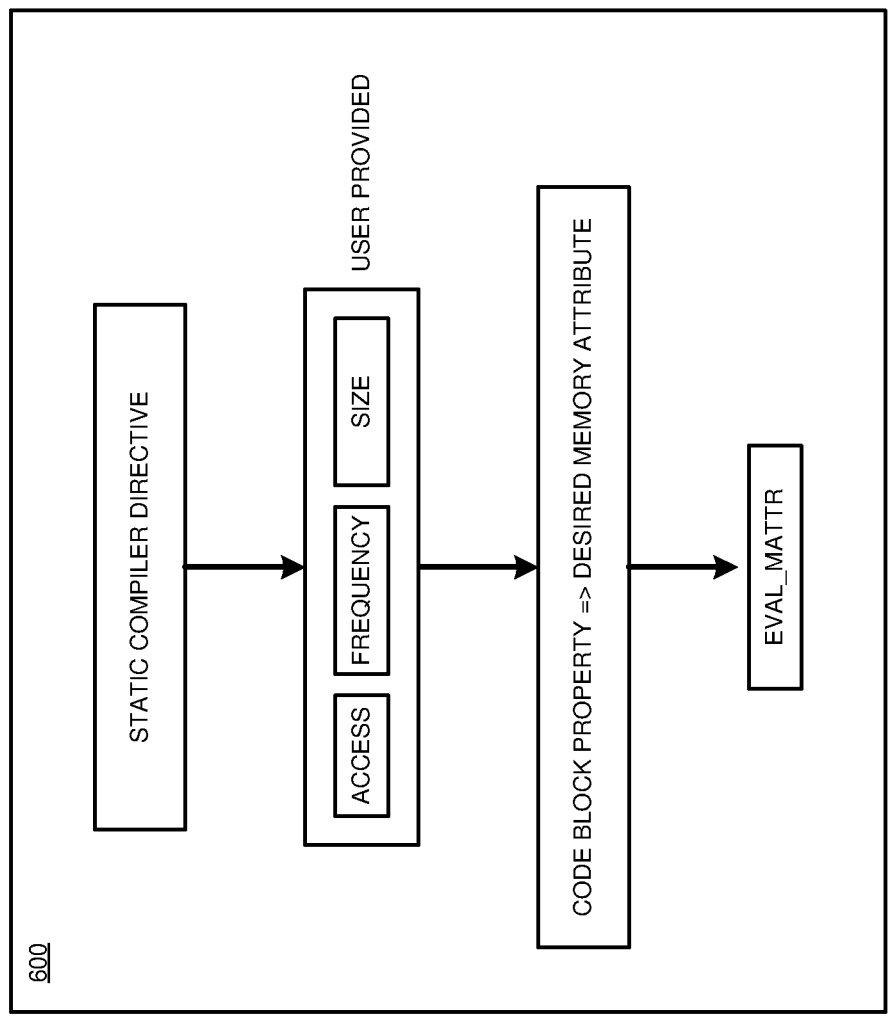
FIG. 6A depicts an example sequence for compiler optimization using a static compiler directive in accordance with an illustrative embodiment.

With reference to FIG. 6A, this figure depicts an example sequence 600 for compiler optimization using a static compiler directive in accordance with an illustrative embodiment. In example sequence 600, a static compiler directive is inserted by the compiler to determine user provided classifications of memory attributes including access pattern, frequency, and size. The compiler further evaluates desired memory attributes from properties of a code block and allocates memory based upon the static memory attributes.

Figure 6B:
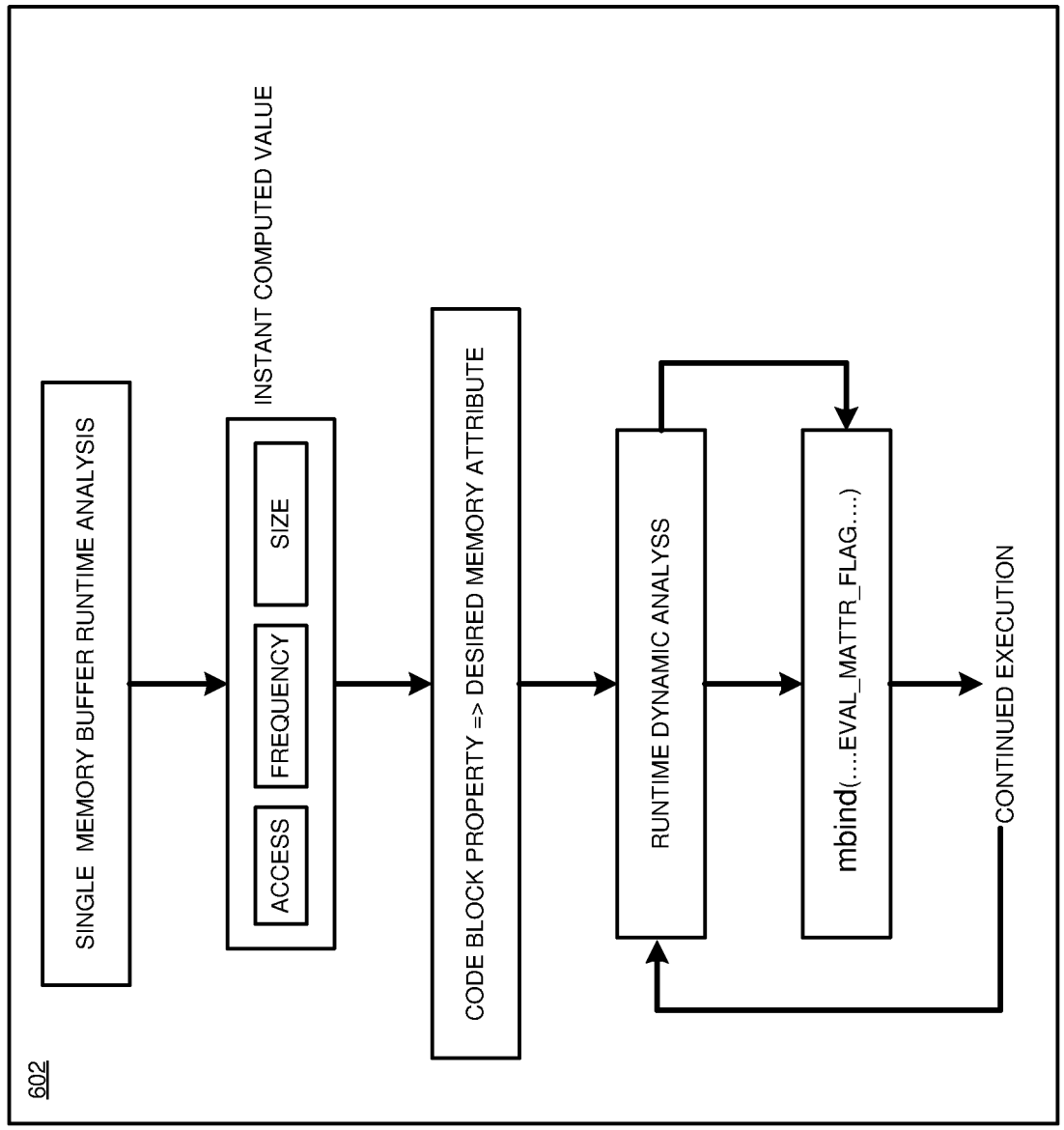
FIG. 6B depicts an example sequence for single memory buffer runtime analysis memory using dynamic compiler optimization in accordance with an illustrative embodiment.

With reference to FIG. 6B, this figure depicts an example sequence 602 for single memory buffer runtime analysis memory using dynamic compiler optimization in accordance with an illustrative embodiment. In example sequence 602, the compiler receives user provided classifications of memory attributes of access pattern, frequency, and size. The compiler further evaluates desired memory attributes from properties of a code block and allocates memory based upon the static memory attributes.

The compiler than performs dynamic runtime analysis to dynamically determine attributes of buffers of interest that cannot be determined statically and allocates memory for the buffers of interest. The runtime dynamic analysis may continue until all buffers of interest have been analyzed.

Figure 7:
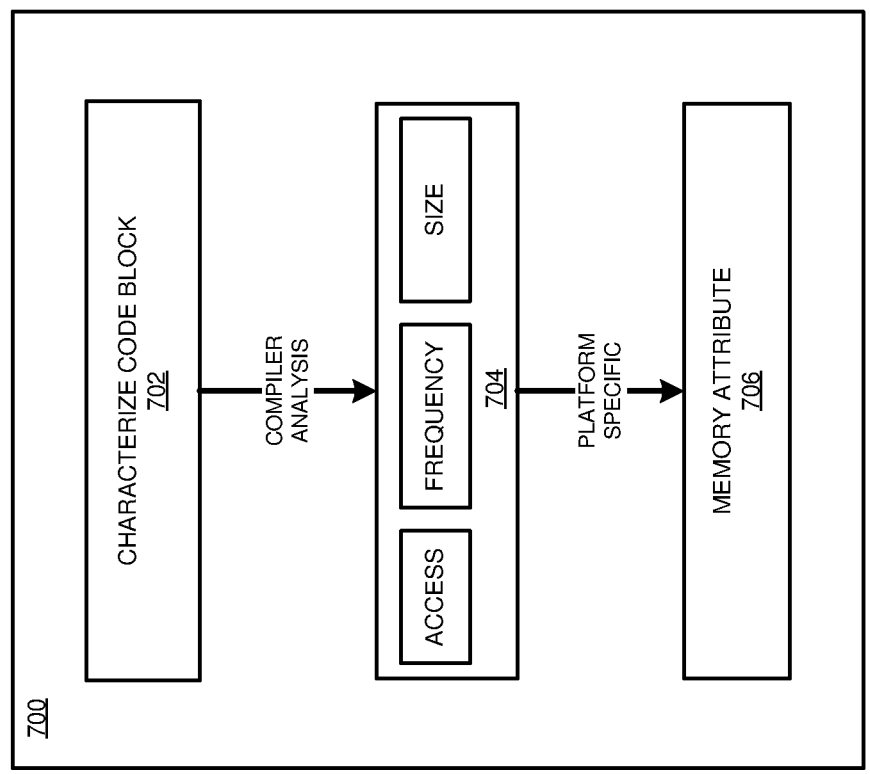
FIG. 7 depicts an overview of a process for predicting physical memory attributes by compiler analysis of code blocks in accordance with an illustrative embodiment.

With reference to FIG. 7, this figure depicts an overview of a process 700 for predicting physical memory attributes by compiler analysis of code blocks in accordance with an illustrative embodiment. In block 702, a compiler characterizes a code block of a source code and analyzes the code block to determine attributes 704 of a buffer of interest including access pattern, frequency, and size. In block 706, the compiler determines platform specific physical memory attributes 706 for allocation of the buffer of interest within particular physical memory of a computing system.

Figure 8:
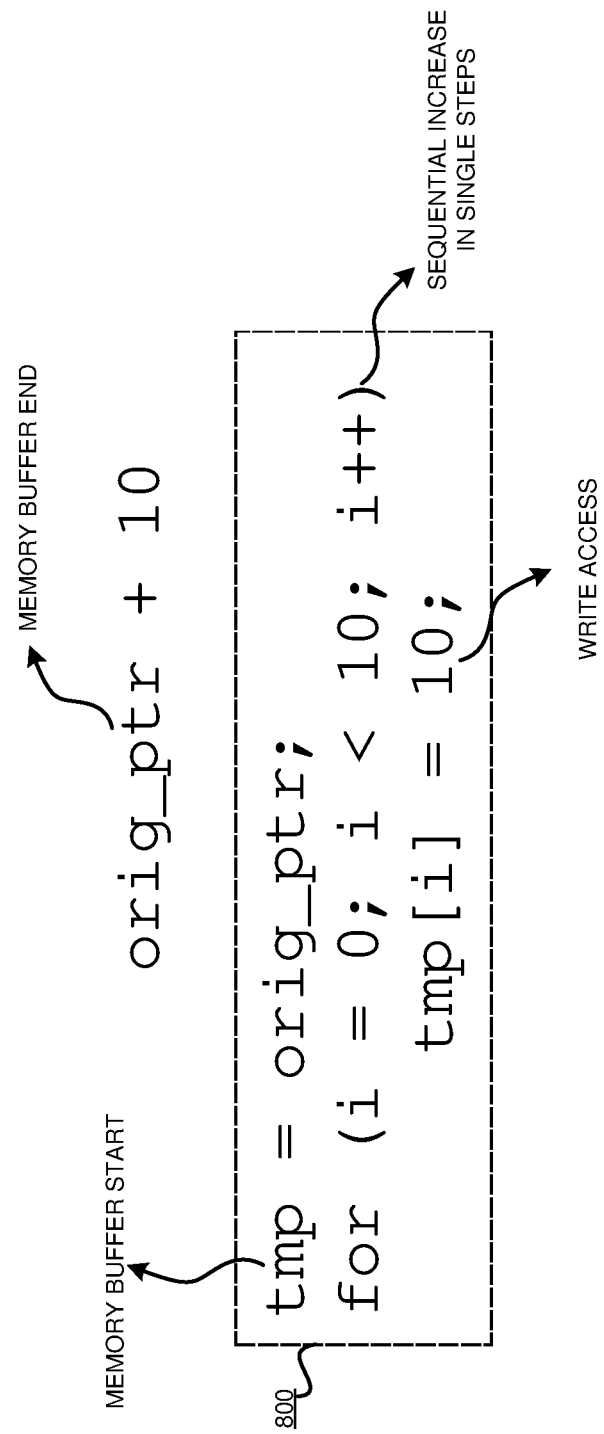
FIG. 8 depicts an example of single memory buffer runtime analysis in accordance with an illustrative embodiment.

With reference to FIG. 8, this figure depicts an example of single memory buffer runtime analysis in accordance with an illustrative embodiment. In the example, an example code block 800 is received by a compiler application. Code block 800 includes an iterative "for" loop having an original pointer "orig_ptr". The original pointer "orig_ptr" holds a virtual address memory buffer received from a kernel. The compiler application analyses an access pattern for the iterative "for loop" for all access into the memory buffer. In particular embodiments, access may occur either through the original pointer or a copied pointer inside the buffer. In order to obtain an accurate determination of access, the compiler application analyzes the memory access pattern for all of the "shadow" pointers as well. In one or more embodiments, the compiler determines an access interleave attribute by determining a loop index increase or decrease pattern within code block 800. In one or more embodiments, the compiler application determines an access frequency attribute by identifying multi-wrapper access of code block 800.

In the example, the compiler application determines a memory buffer start "tmp=orig_ptr;" and a memory buffer end "orig_ptr+10" within code block 800. The compiler further identifies a sequential increase in single steps of the loop index "i++" and write access to the memory buffer "tmp[i]=10;".

Figure 9:
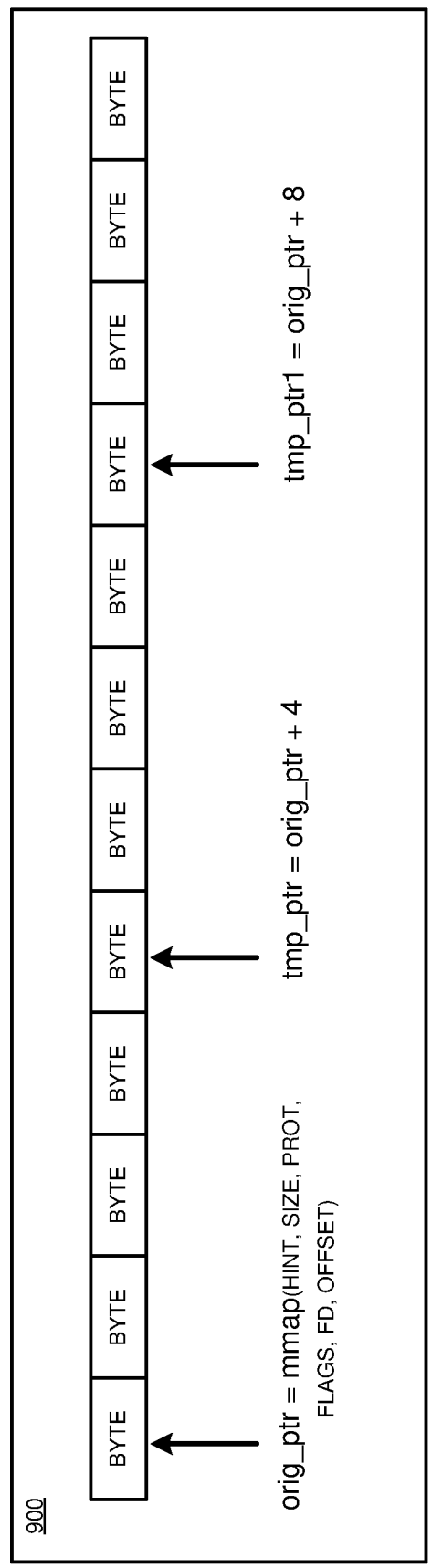
FIG. 9 depicts an example of detecting memory accesses in accordance with an illustrative embodiment.

With reference to FIG. 9, this figure depicts an example of detecting memory accesses in accordance with an illustrative embodiment. In the example, virtual memory is allocated for a buffer 900 using a system call (e.g., mmap, brk, shm, etc.) and the virtual memory is assigned to a pointer referred to herein as the original memory pointer. In the example, buffer 900 is of a 12-byte size including an original pointer "orig_ptr" at the first byte, a first temporary pointer "tmp_ptr" at the fifth byte ("orig_ptr+4") and a second temporary pointer "tmp_ptr1" at the ninth byte ("orig_ptr+8"). In the embodiment, the compiler application tracks the original pointer and/or a copy (e.g., a temporary pointer) of the pointer to prevent memory leak. In the embodiment, the compiler detects memory accesses by identifying dereferencing of a memory location by a pointer and an index.

Figure 10:
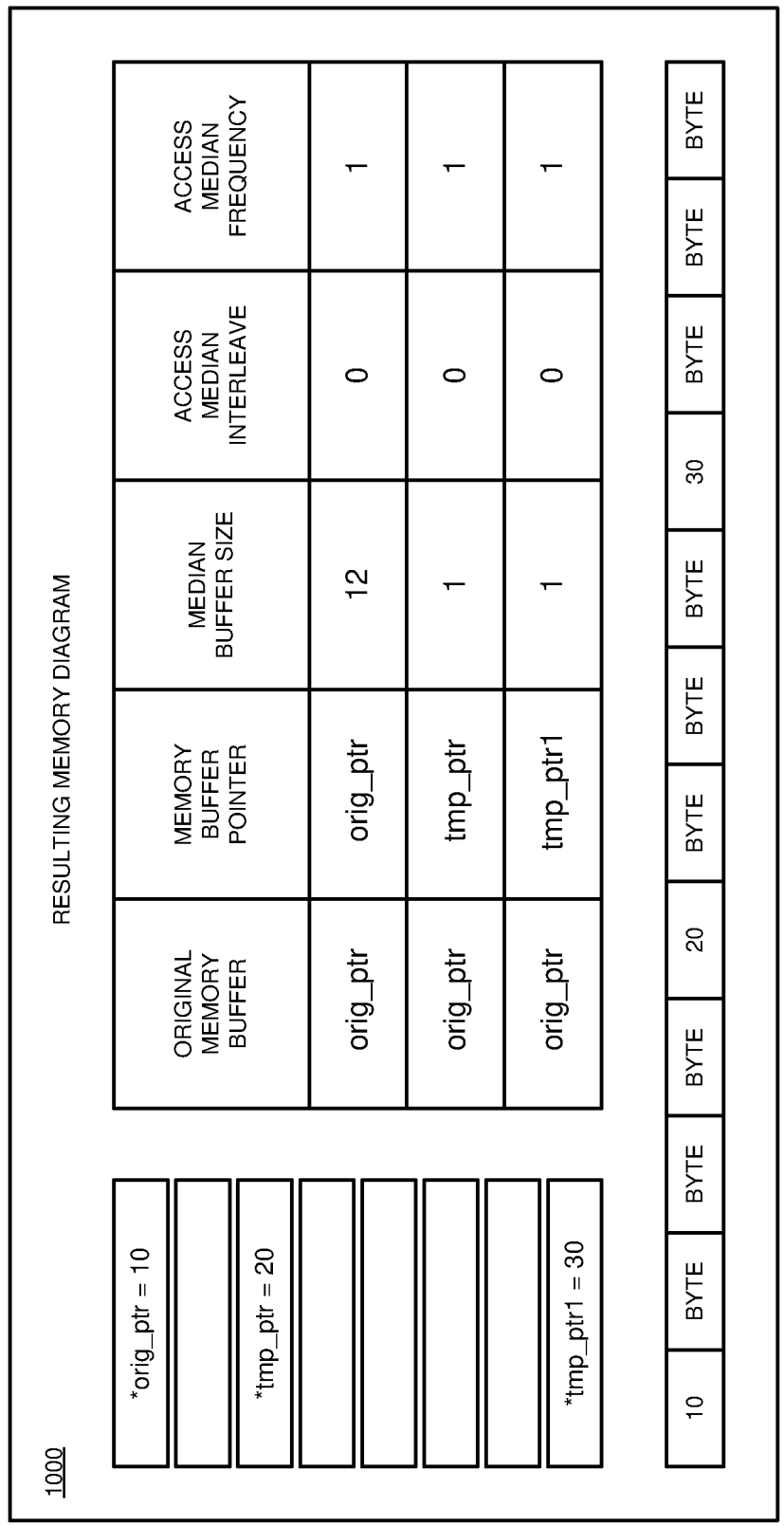
FIG. 10 depicts an example of sparse random memory access in accordance with an illustrative embodiment.

With reference to FIG. 10, this figure depicts an example of sparse random memory access in accordance with an illustrative embodiment. In the example, the compiler application parses source code text to identify sparse references to memory pointers and having no block wise access for the memory buffer (e.g., for loop, while loop, do while loop, etc.). In such cases, the compiler application can count buffer references finitely without any or much repetition. FIG. 10 illustrates an example resulting memory diagram 1000 including a table referencing an identifying an original memory buffer pointer of an original memory buffer, an associated median buffer size, an access median interleave, and an access median frequency.

In the example, memory diagram 1000 shows an original pointer "orig_ptr" having a median buffer size of 12 bytes, an access median interleave of 0, and an access median frequency of 1. Memory diagram 1000 further shows a first temporary pointer "tmp_ptr" having a median buffer size of 1 byte, an access median interleave of 0, and an access median frequency of 1. Memory diagram 1000 still further shows a second temporary pointer "tmp_ptr1" having a median buffer size of 1 byte, an access median interleave of 0, and an access median frequency of 1.

In an embodiment, for repeated random access cases, the compiler application identifies memory pointers referenced repeatedly with no block wise access for the memory buffer (for loop, while loop, do while loop, etc.). In the embodiment, the compiler application counts references by their occurrence inside loops such as for, while and do while loops to determine an access median frequency for a code block. In various embodiments, repeated random access can also occur in complex data structure assignments either in the same loop or in a function call within a loop. In such situations, the compiler application may count references by their occurrence inside loops such as for, while, and do while loops to determine access median frequency for a buffer.

In an embodiment, the compiler application may estimate median interleave within a buffer by dynamic profiling to capture load addresses and uses the captured load addresses to estimate median interleave. In a particular embodiment, the compiler application inserts instrumentation into the source code, runs the application with a smaller training input, and records offset of load addresses to estimate median interleave.

In another embodiment, for repeated sequential access cases, the compiler application may identify text within the source code having repeated reference to memory pointers and block wise access to the memory buffer for an iterative loop (e.g., for loop, while loop, do while loop, etc.).

Examples of code blocks and corresponding attributes for repeated sequential access is as follows:

Example 1 tmp=orig_ptr;
for (i=0; i<10; i++)
  tmp[i]=10;
Access Memory Pointer: tmp
Access Median Size: 10
Access Median Interleave: 1
Access Median Frequency: 1

Example 2 tmp=orig_ptr;
for (i=0; i<10; i=i+2)
  tmp[i]=10;
Access Memory Pointer: tmp
Access Median Size: 10
Access Median Interleave: 2
Access Median Frequency: 1

Example 3 tmp=orig_ptr;
for (i=0; i<100; i=i+5)
  tmp[i]=10;
Access Memory Pointer: tmp
Access Median Size: 100
Access Median Interleave: 5
Access Median Frequency: 1

Example 4 tmp=orig_ptr;
for (j=0; j<20; j++) {
  for (i=0; i<10; i++)
    tmp[i]=10;
}
Access Memory Pointer: tmp
Access Median Size: 10
Access Median Interleave: 1
Access Median Frequency: 20

Example 5 tmp=orig_ptr;
for (j=0; j<20; j++) {
  for (i=0; i<100; i=i+5)
    tmp[i]=10;
}
Access Memory Pointer: tmp
Access Median Size: 100
Access Median Interleave: 5
Access Median Frequency: 20

Example 6 tmp=orig_ptr;
for (j=0; j<20; j=j+5) {
  for (i=0; i<100; i=i+5)
    tmp[i]=10;
}
Access Memory Pointer: tmp
Access Median Size: 100
Access Median Interleave: 5
Access Median Frequency: 5

In one or more embodiments, the compiler application accounts for repeated access if a reference either directly appears inside a loop as discussed above or if the reference occurs in a function which is called from within a loop. For example, if pointer access occurs in a function which is at a depth of N in a call tree of the application, the parent function having the loop may be in the call tree depth of N−b 1, . . . 1.

Figure 11:
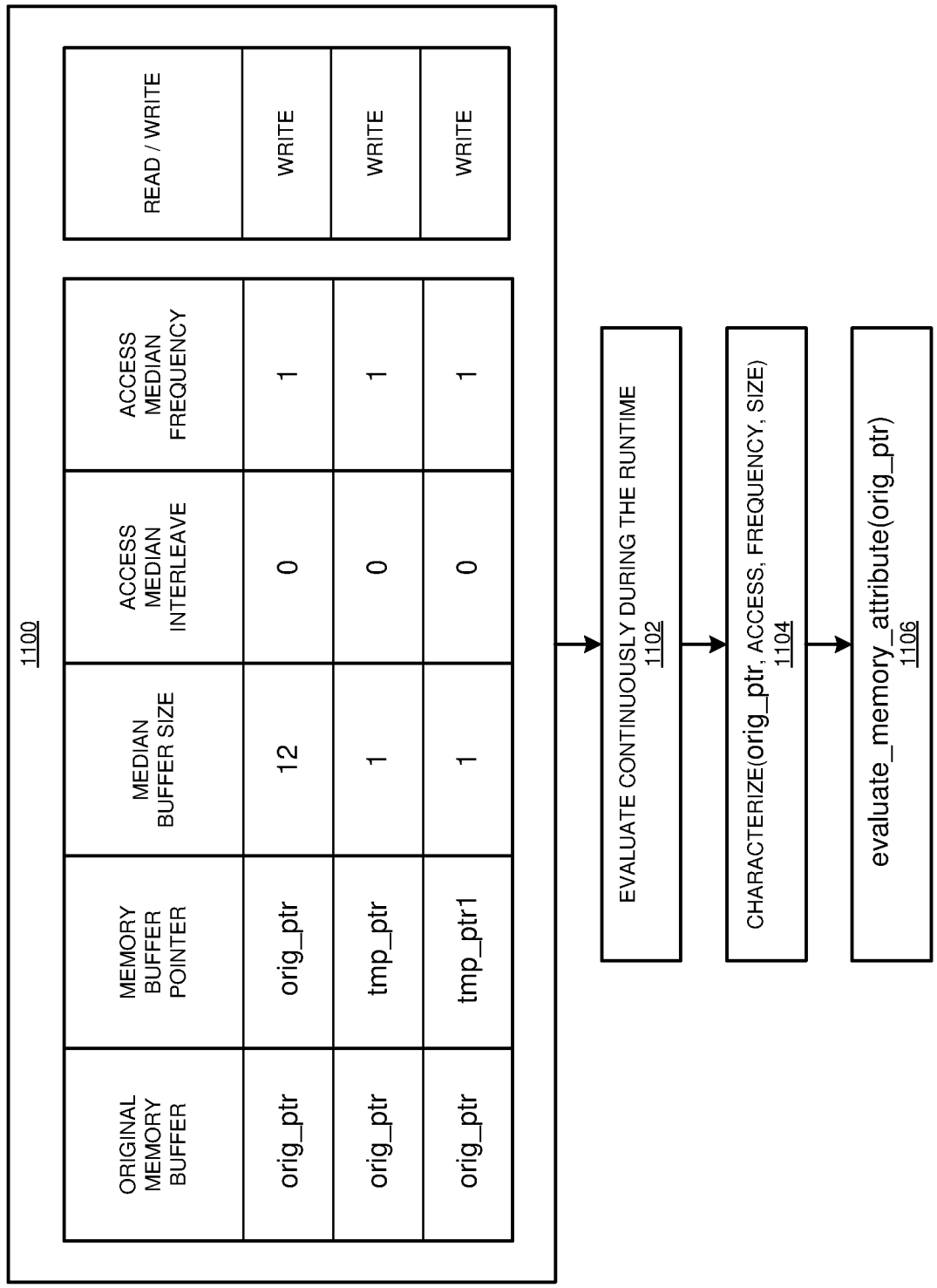
FIG. 11 depicts an example dynamic memory access table in accordance with an illustrative embodiment.

With reference to FIG. 11, this figure depicts an example dynamic memory access table 1100 in accordance with an illustrative embodiment. Dynamic memory access table 1100 includes an original memory buffer field identified by a memory buffer pointer field, a median buffer size field including a median buffer size value, an access median interleave field including an access median interleave value, an access median frequency field including an access median frequency value, and a read/write field indicative of whether the buffer access is a read or write operation. In the illustrated embodiment, dynamic memory access table 1100 shows an original pointer "orig_ptr" having a median buffer size of 12 bytes, an access median interleave of 0, an access median frequency of 1, and a read/write value of "WRITE"; a first temporary pointer "tmp_ptr" having a median buffer size of 1 byte, an access median interleave of 0, an access median frequency of 1, and a read/write value of "WRITE"; and a second temporary pointer "tmp_ptr1" having a median buffer size of 1 byte, an access median interleave of 0, an access median frequency of 1, and a read/write value of "WRITE".

In an embodiment, the compiler application updates dynamic memory access table 1100 by evaluating buffers of interest continuously during runtime (block 1102), characterizing the buffers of interest by determining buffer access characteristics including access pattern, frequency, and size information of the buffer of interest (block 1104), and evaluating memory attributes of the buffer of interest (block 1106).

With reference to FIG. 12, this figure depicts an example buffer access character table 1200 in accordance with an illustrative embodiment. In one or more embodiments, a buffer access character of a buffer of interest includes three components: an access pattern, frequency, and size. In particular embodiments, access pattern, frequency, and size are specified as part of a compiler static directive for statically determined buffers of interest and repeatedly evaluated dynamically for a buffer in a dynamic optimization scheme for buffers of interest for which the attributes cannot be determined statically.

Buffer access character table 1200 classifies each of the three components of the buffer access character by a multiple of levels and provides a 2-bit representation of each classification level. In buffer access table 1200, The access pattern component is classified as serial access represented by "00", medium access represented by "10", or random access represented by "11"; the frequency component is classified as low represented by "0" or high represented by "1"; and the size component is classified as low represented by "00", medium represented by "01", or high represented by "11". As an example, if a buffer of interest of source code is serial, highly frequent, and spanning across medium size locations, the buffer access character is represented by <00-1-01>.

With reference to FIG. 13, this figure depicts an example physical memory attribute table 1300 in accordance with an illustrative embodiment. In one or more embodiments, physical memory attributes include latency, bandwidth, power consumption, device compute capability, persistence, and size. In one or more embodiments, the buffer access character components (e.g., access pattern, frequency, and size) are mapped by the compiler application to a physical memory attribute using physical memory attribute table 1300 and used as part of a system call to allocate a buffer in particular memory meeting the physical memory attributes.

In the illustrated embodiment, physical memory attribute table 1300 maps particular types of memory to each of the physical memory attributes using a value indicative of a ranking of the particular physical memory attribute with respect to the particular type of memory having possible values of "00", "01", "10" and "11" with "00" representing a worst ranking for the physical memory attribute in that segment and "11" representing a best ranking for the physical memory attribute in that segment. An "x" represents the particular physical memory attribute is not relevant for determining a suitable memory type. In the illustrated embodiment, the memory types include high bandwidth memory (HBM), low-latency DRAM (LLDRAM), DDR4 DRAM, DDR5 DRAM, non-volatile dual in-line memory module (NVDIMM), STT MRAM, phase change memory (PCM), 3D XPoint (3D XP), hybrid memory cube (HMC), and low-power DDR (LPDDR). Although the embodiment of FIG. 13 shows particular example types of memory technology, it should be understood that in other embodiments any suitable memory may be represented in physical memory attribute table 1300.

As an example, a DDR5 DRAM based memory is represented as <01-01-11-10-x-11-00> representative of a latency value of "01", a bandwidth value of "01", a reliability value of "11", a power consumption value of "10", a device compute ability value of "x", a density value of "11", and a persistence value of "00".

With reference to FIG. 14, this figure depicts an example buffer access character to physical memory attributes mapping table 1400 in accordance with an illustrative embodiment. Buffer access character to physical memory attributes mapping table 1400 maps a buffer access tuple of <access pattern-frequency-size> to a physical memory tuple of <latency-bandwidth-reliability-power-device compute-density-persistence> as shown in FIG. 14.

For attributes computed dynamically using instrumentation, the compiler implements the optimization in a profile directed feedback optimization (e.g., using a compiler flag-fprofile-generate in a GNU Compiler Collection (GCC) compiler) in one or more embodiments. In this type of optimization, a program is first compiled with a profile generate option, the binary code is run with a smaller training input, and a profile is generated. The application is then compiled with a profile use option (e.g., using a compiler flag-fprofile-use in a GCC compiler) which considers the profile information including the dynamic instrumentation generated which is used to accurately determine memory attributes for buffers of interest to generate the final optimized binary.

Figure 15:
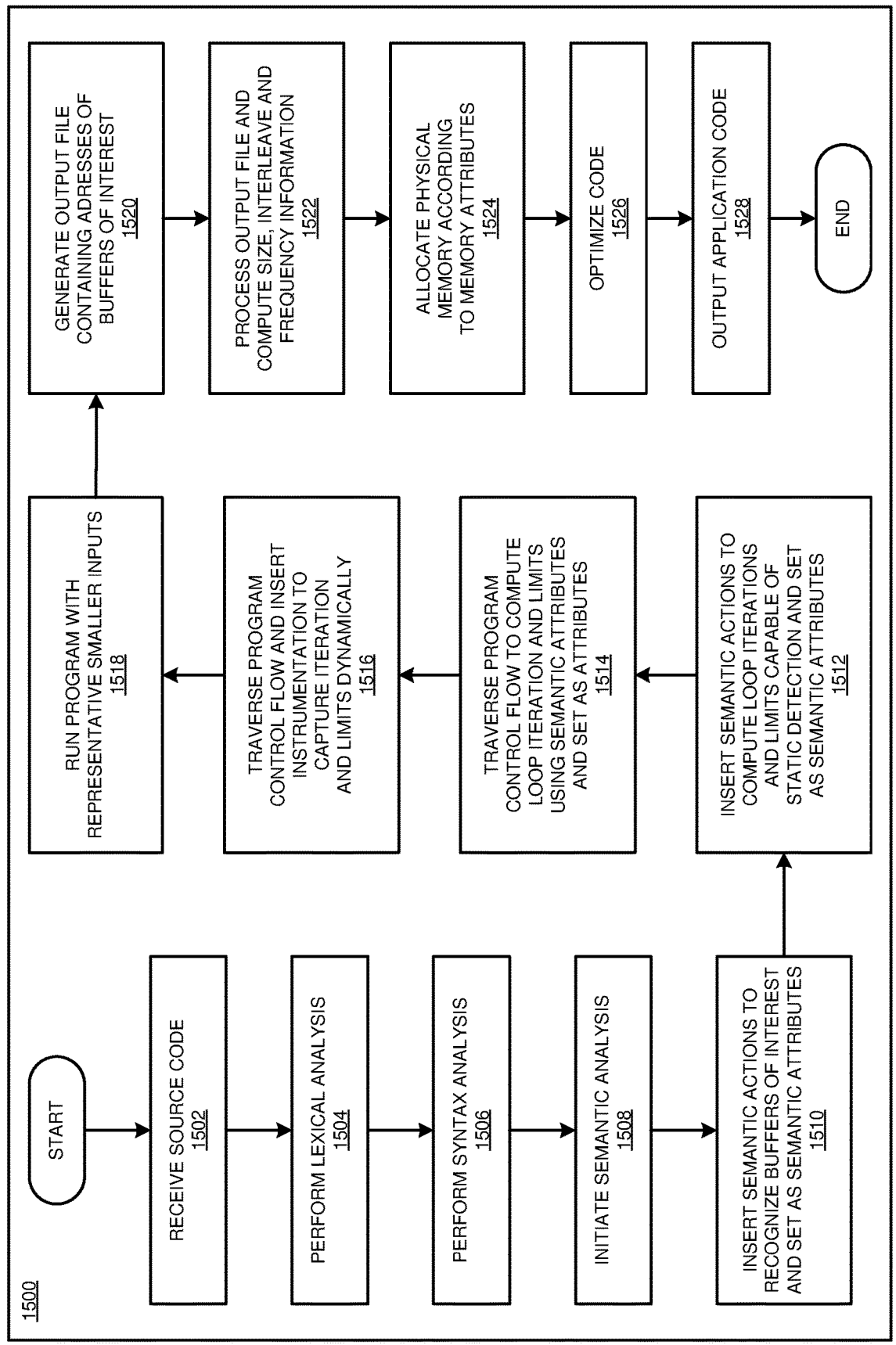
FIG. 15 depicts a flowchart of an example process for predicting physical memory attributes by compiler analysis of code blocks in accordance with an illustrative embodiment.

With reference to FIG. 15, this figure depicts a flowchart of an example process 1500 for predicting physical memory attributes by compiler analysis of code blocks in accordance with an illustrative embodiment. In block 1502, compiler application 105 receives source code for compiling to generate application 146 to be stored within memory subsystem 144 and executed by server 140. In the embodiment, the source code contains one or more buffers of interest to be allocated within memory subsystem 144. In block 1504, compiler application 105 performs lexical analysis on the source code using lexical grammar rules to tokenize portions of the source code to produce a sequence of tokens.

In block 1506, compiler application 105 parses and performs syntax analysis on the source code to verify according to a syntax grammar that a valid sequence of tokens are produced from the lexical analysis and generate a syntax tree. In block 1508, compiler application 105 initiates semantic analysis of the source code. In block 1510, compiler application 105 inserts semantic actions for recognizing buffers of interest and sets buffer of interest characteristics in the semantic action as semantic attributes of program variables and statements. In block 1512, compiler application 105 inserts semantic actions to compute loop iterations and limits within the source code that can be detected statically, and sets these loop characteristics as semantic attributes of program variables and statements.

In block 1514, compiler application 105 traverses a program control flow of the source code and computes, using semantic attributes, the loop iteration and limits that can be detected statically and sets these as attributes of program statements. In block 1516, compiler application 105 traverses the program control flow and inserts instrumentation to capture the iteration and limits information dynamically for cases in which the iterations and limits cannot be determined statically.

In block 1518, compiler application 105 runs the program code with representative smaller inputs. In block 1520, compiler application 105 generates an output file containing the addresses of buffers of interest within the source code. In 1522, compiler application 105 processes the output file and computes memory attributes including size, interleave, and frequency information for each of the buffers of interest. In a particular embodiment, for a use case in which all of the attributes can be detected statically (e.g., if the program code only has "for" loops with constant loop counts), blocks

1516, 1518, and 1522 may be omitted and process 1500 may flow from block 1514 to block 1524.

In block 1524, compiler application 105 selects a physical memory from one or more different types of technologies of physical memory present in memory subsystem 144 for a buffer of interest and allocates the physical memory within output application code for the buffer of interest based upon the memory attributes of the buffer of interest and physical memory attributes of the selected physical memory.

In block 1526, compiler application 105 high level optimization on the semantically analyzed code to generate optimized intermediate code and low level optimization on the optimized intermediate code to generate executable application code 146. In block 1528, compiler application 105 outputs executable application code 146. In one or more embodiments, server 104 sends executable application code 146 to server 140, and server 140 stores application code 146 within the selected memory of memory subsystem 144 for execution by processor 142. Process 1500 then ends.

Thus, a computer implemented method, system or apparatus, and computer program product are provided in the illustrative embodiments for predicting physical memory attributes by compiler analysis of code blocks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   receiving source code including at least one code block;
   identifying a buffer associated with the at least one code block;
   determining buffer access characteristics associated with the buffer from the at least one code block;
   mapping the buffer access characteristics to physical memory attributes associated with one or more physical memories of a computing system; and
   generating executable program code including a system call associated with memory allocation based upon the physical memory attribute values.

2. The computer-implemented method of claim 1, wherein the buffer access characteristics include one or more of an interleave value of the buffer, a frequency of access of the buffer, or a size of the buffer.

3. The computer-implemented method of claim 1, wherein identifying the buffer includes inserting semantic actions in the at least one source block to detect the buffer.

4. The computer-implemented method of claim 1, wherein determining the buffer access characteristics further includes determining loop iterations and loop limits of an iterative loop within the at least one code block.

5. The computer-implemented method of claim 1, wherein determining the buffer access characteristics further includes inserting instrumentation within the at least one code block to capture loop iterations and loop limits of an iterative loop within the at least one code block during execution of the at least one code block.

6. The computer-implemented method of claim 5, further comprising:
   generating an output file including buffer information from the instrumentation; and
   processing the output file to compute the buffer access characteristics.

7. The computer-implemented method of claim 1, further comprising:
   selecting a memory type of the one or more physical memories based upon the mapping of the buffer access characteristics to physical memory attribute values.

8. The computer-implemented method of claim 1, wherein the determining of the buffer access characteristics associated with the buffer includes semantic analysis of the at least one code block.

9. The computer-implemented method of claim 1, wherein identifying the buffer associated with the at least one code block further includes identifying a memory pointer in the at least one code block.

10. The computer-implemented method of claim 1, wherein the physical memory attributes include one or more of a latency, a bandwidth, a power consumption, a device compute ability, a persistence, or a size of a memory device.

11. A computer usable program product comprising one or more computer-readable storage devices, and program instructions stored on at least one of the one or more storage devices, the stored program instructions comprising:
    program instructions to receive source code including at least one code block;
    program instructions to identify a buffer associated with the at least one code block;
    program instruction to determine buffer access characteristics associated with the buffer from the at least one code block;
    program instructions to map the buffer access characteristics to physical memory attributes associated with one or more physical memories of a computing system; and
    program instructions to generate executable program code including a system call associated with memory allocation based upon the physical memory attribute values.

12. The computer usable program product of claim 11, wherein the buffer access characteristics include one or more of an interleave value of the buffer, a frequency of access of the buffer, or a size of the buffer.

13. The computer usable program product of claim 11, wherein the program instructions to identify the buffer includes program instructions to insert semantic actions in the at least one source block to detect the buffer.

14. The computer usable program product of claim 11, wherein the program instructions to determine the buffer access characteristics further includes program instructions to determine loop iterations and loop limits of an iterative loop within the at least one code block.

15. The computer usable program product of claim 11, wherein the program instructions to determine the buffer access characteristics further includes program instructions to insert instrumentation within the at least one code block to capture loop iterations and loop limits of an iterative loop within the at least one code block during execution of the at least one code block.

16. The computer usable program product of claim 15, further comprising:
program instructions to generate an output file including buffer information from the instrumentation; and
program instructions to process the output file to compute the buffer access characteristics.

17. The computer usable program product of claim 11, further comprising:
program instructions to select a memory type of the one or more physical memories based upon the mapping of the buffer access characteristics to physical memory attribute values.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive source code including at least one code block;
program instructions to identify a buffer associated with the at least one code block;
program instruction to determine buffer access characteristics associated with the buffer from the at least one code block;
program instructions to map the buffer access characteristics to physical memory attributes associated with one or more physical memories of a computing system; and
program instructions to generate executable program code including a system call associated with memory allocation based upon the physical memory attribute values.

\* \* \* \* \*